United States Patent [19]
Diehl et al.

[11] Patent Number: 5,799,540
[45] Date of Patent: Sep. 1, 1998

[54] SELECTOR FORK FOR A CHANGE-SPEED GEARBOX

[75] Inventors: Axel Diehl, Korschenbroich; Ralf Fritzsche, Cologne; Klaus Groth, Bergisch Gladbach, all of Germany

[73] Assignee: Ford Global Technologies, Inc., Dearborn, Mich.

[21] Appl. No.: 761,053

[22] Filed: Dec. 5, 1996

[30] Foreign Application Priority Data

Jan. 20, 1996 [DE] Germany ............ 196 02 041.7

[51] Int. Cl.⁶ .......... F16H 57/04; F01M 9/06; F16D 13/74
[52] U.S. Cl. .......... 74/473.37; 74/467; 74/339; 184/11.1; 184/11.2; 184/6.12; 192/53.32; 192/113.5
[58] Field of Search ........... 192/113.5, 113.3, 192/53.32, 82 R; 74/467, 473 R, 339; 184/11.2, 11.1, 6.12

[56] References Cited

U.S. PATENT DOCUMENTS

| | | | |
|---|---|---|---|
| 3,529,698 | 9/1970 | Nelson | 184/11.2 X |
| 3,587,783 | 6/1971 | Walters | 184/11.1 |
| 5,201,237 | 4/1993 | Berndtson | 192/82 R X |

FOREIGN PATENT DOCUMENTS

| | | | |
|---|---|---|---|
| 0059396 A2 | 9/1982 | European Pat. Off. | |
| 0513840 A1 | 5/1992 | European Pat. Off. | |
| 3015681C2 | 7/1981 | Germany | |
| 804-962 | 2/1981 | U.S.S.R. | 74/467 |
| 1200-047-A | 12/1985 | U.S.S.R. | 74/467 |

*Primary Examiner*—Charles A. Marmor
*Assistant Examiner*—Ankur Parekh
*Attorney, Agent, or Firm*—James J. Dottavio

[57] ABSTRACT

A selector fork for a change-speed gearbox, comprising first and second shafts rotatably supported by the gearbox. A pinion and gear pair are supported by the first and second shafts, respectively. A synchronizer is supported by one of the first and second shafts adjacent the pinion and gear pair. A selector rod having a longitudinal axis is supported by the gearbox. A selector fork is slidably supported by the selector rod. The selector fork provides for the directed supply of splash oil to one of the group comprising the selector fork and the synchronizer.

5 Claims, 4 Drawing Sheets

SELECTOR FORK FOR A CHANGE-SPEED GEARBOX

BACKGROUND OF THE INVENTION

1. Field of the Invention

The invention relates to a selector fork for a change-speed gearbox which forms a part of a gear-shifting mechanism of a gearbox, particularly a shifter fork providing a directed supply of splash oil.

2. Discussion of Related Prior Art

A selector fork is known from European patent specification 0 059 396 (EPO '396). In this known selector fork, the means for the directed supply of splash oil serves only for better lubrication of the sliding faces of the selector fork which cooperate with the selector sleeve. The case 26 in the '396 patent collects the splash oil and directs it to the shift fork 24 to lubricate between the shift fork 24c and the synchronizer collar 30.

German specification 30 15 681 (DE '681) discloses a lubricating device for a radial bearing of a change-speed gearbox, in which a radial bearing not in a good position for the access of lubricating oil is supplied with sufficient lubricating oil by means of an oil capture region in the meshing section of two gearwheels in combination with an oil guide plate fixed to the housing and a rotating part having a substantially radial oil capture groove.

Neither EPO '396 nor DE '681 teaches or suggests a means for directing lubrication to a forward gear synchronizer ring.

European patent specification 0 513 840 A1 (EPO '840) shows an oil collector insert for lubricating a synchronizer. As described at page 3, column 3 of the EPO '840 patent, the insert includes a c-shaped scraper blade 14 which scrapes oil form a surface 13 of the synchronizer sleeve 12 to cause the scraped oil to drip toward the engagement surface 16 of the synchronization device. EPO '840 scrapes the oil from the sleeve and does not provide an adequate means to direct the oil to the synchronizer ring and gears.

SUMMARY OF THE INVENTION

The present invention is concerned with a problem of inadequate lubrication of a synchronizer unit of a forward gear, which is situated above the oil level in the gearbox, and in which, under high loads, overheating of the synchronizer ring, and consequent possible failure, can tend to occur. The present invention seeks to collect oil in a simple means and provide an adequate means of redirecting the oil to lubricate the synchronizer and a gear.

Investigations have shown that in some idling situations of the gearbox, synchronization can occur, so that the synchronizing unit is more highly loaded and requires an improved supply of lubricant in order to operate reliably.

It is an object of the invention to provide a lasting solution to this lubrication problem by simple means. According to the invention, this object is achieved if, in a selector fork of the kind referred to, the means for supplying splash oil consists of a baffle plate extending in the direction of the longitudinal axis of the selector fork into the vicinity of a gearwheel, which dips below the surface of the lubricating oil, and having adjacent to and below it a rolled-up collecting channel, and if a directed drain for the lubricating oil is located in the collecting channel, so that when the synchronizing unit is synchronized, the synchronizer ring is provided with additional lubricating oil.

Providing the synchronizing unit with additional lubricating oil in this way, when synchronization of a forward gear occurs, also improves the lubrication of the synchronizing unit concerned in the case of prolonged synchronization, so that deficient lubrication no longer occurs.

BRIEF DESCRIPTION OF THE DRAWINGS

The invention will be described in more detail, by way of example, with reference to an embodiment shown in the accompanying drawings, in which.

DETAILED DESCRIPTION OF A PREFERRED EMBODIMENT

The Figures mainly show a gearbox housing 1 having an input shaft 2 and a layshaft or output shaft 3 fitted and rotatably mounted in it in a manner that is known and will not be explained in more detail.

The design of the change-speed gearbox is conventional and will therefore not be described in detail here.

Figure 1:
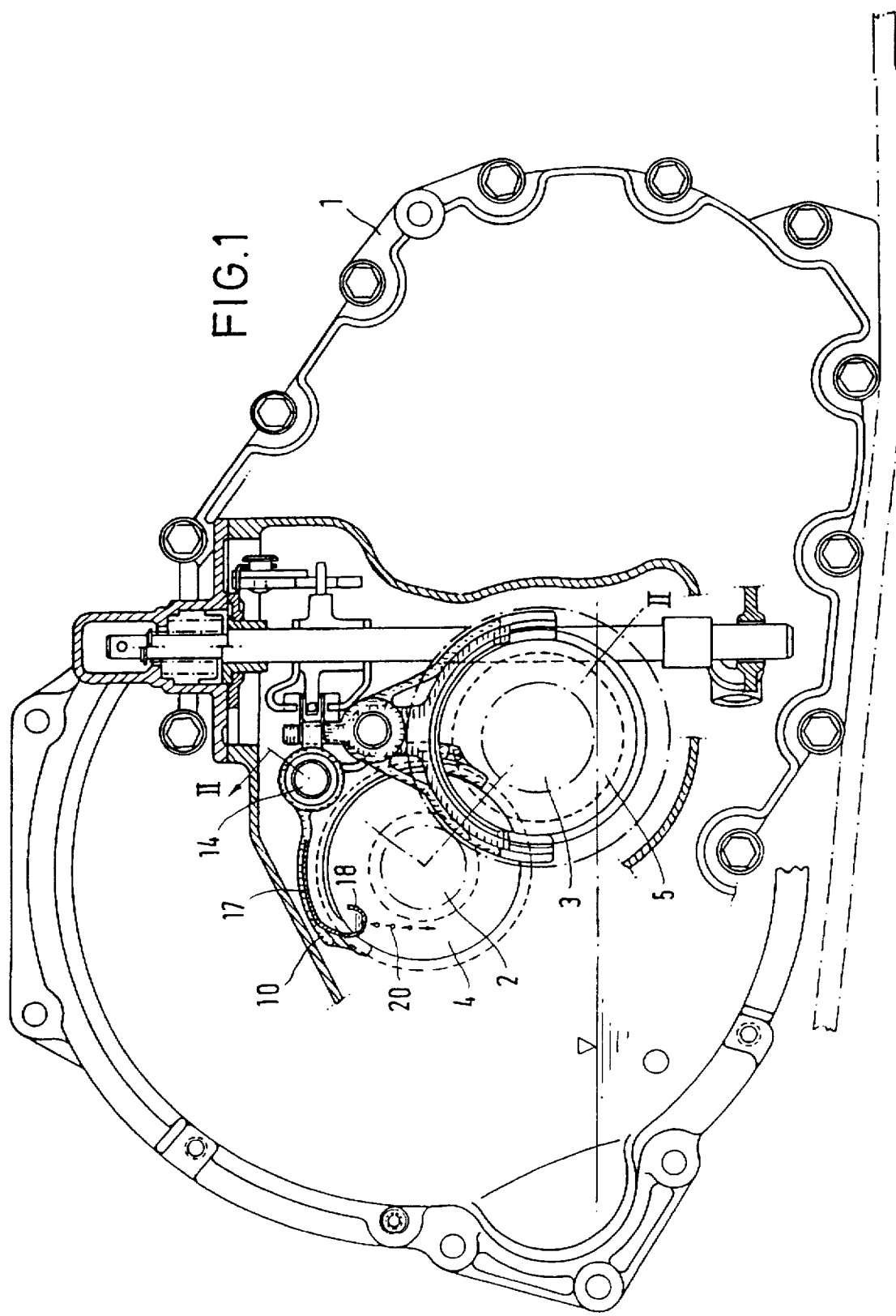
FIG. 1 is a vertical partial section through a gear shifting mechanism including a selector fork according to the present invention.
Figure 2:
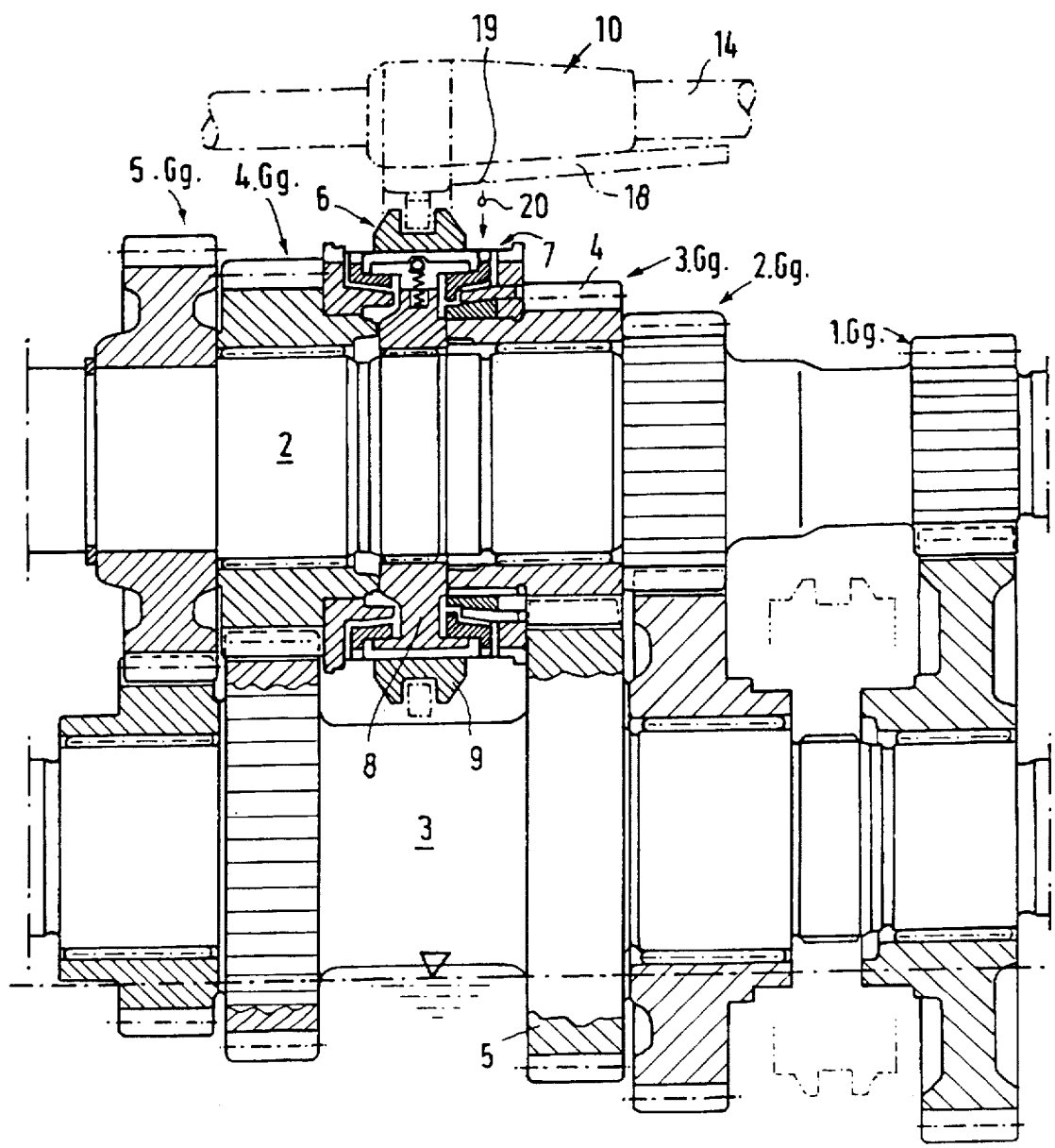
FIG. 2 is a partial section along the line II—II in FIG. 1.

For the purpose of explaining the invention, only those parts which are essential for the invention are provided with reference symbols in FIGS. 1 and 2.

The input shaft 2 carries, for example, a free-running loose gearwheel 4, which is in meshing engagement with a fixed gearwheel 5 carried on the layshaft 3. The fixed gearwheel 5 dips below the surface of the lubricating oil and throws splash oil upwards.

Fitted on the input shaft 2 is a synchronizing unit 6, which can form a driving connection between the loose gearwheel 4 and the input shaft 2 via a synchronizer ring 7.

The synchronizing device 6 consists of a fixed synchronizer hub 8 on the input shaft, a selector sleeve 9 fitted nonrotatably but axially displaceably on the hub, and a synchronizer ring 7.

The synchronizer ring 7 can be formed as a single or double synchronizer ring of known design.

Cooperating with the selector sleeve 9 is a selector fork 10, which comprises a selector fork hub 11, a selector arm 12, and the selector fork proper 13.

The selector fork 10 is axially displaceable, together with its selector fork hub 11, on an ordinary selector rod 14, in order to shift the corresponding gear ratios by displacing the selector sleeve 9 and the synchronizer ring 7.

Figure 3:
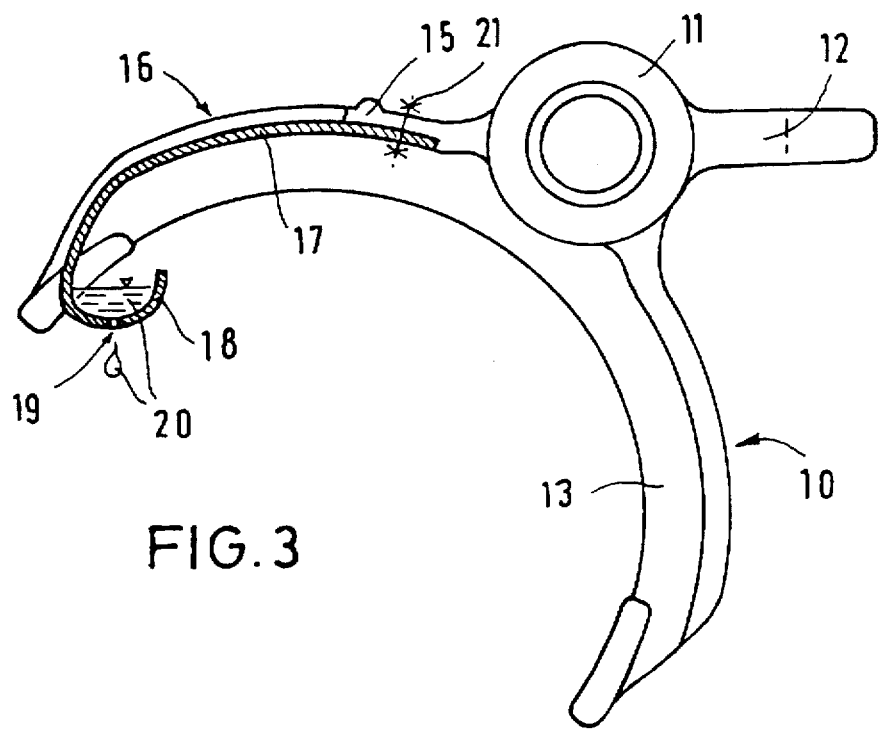
FIG. 3 is a side view on a larger scale of a selector fork in accordance with the invention.
Figure 4:
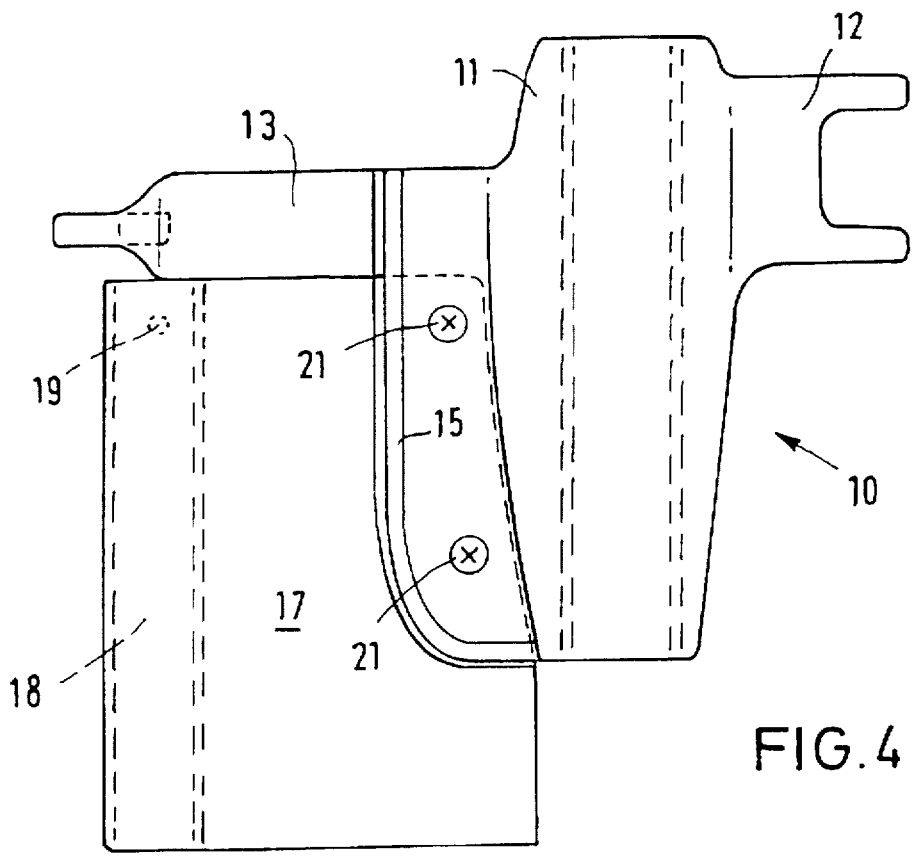
FIG. 4 is a top plan view of the selector fork shown in FIG. 3.

In FIGS. 3 and 4, the form of the selector fork 11, in accordance with the invention, is explained in more detail.

Attached to the selector fork hub 11, which for the purpose of collecting lubricating oil for the selector fork shoe is already provided with an axially extending rib 15, is a device 16 for supplying splash oil, which consists of a splash oil collecting baffle plate 17, a collecting channel 18 for forwarding the lubricating oil, and a drain 19 for the lubricating oil 20.

The drain 19 is located so that when synchronization of the forward gear occurs, the lubricating oil 20 drips down directly at the point where it serves for additional lubrication of the synchronizing unit 6.

In FIGS. 3 and 4, an embodiment of the device for supplying lubricating oil is shown, which is built onto the original form of the selector fork 10 and enables the baffle plate 17 to be retrofitted by means of screws 21.

Figure 5:
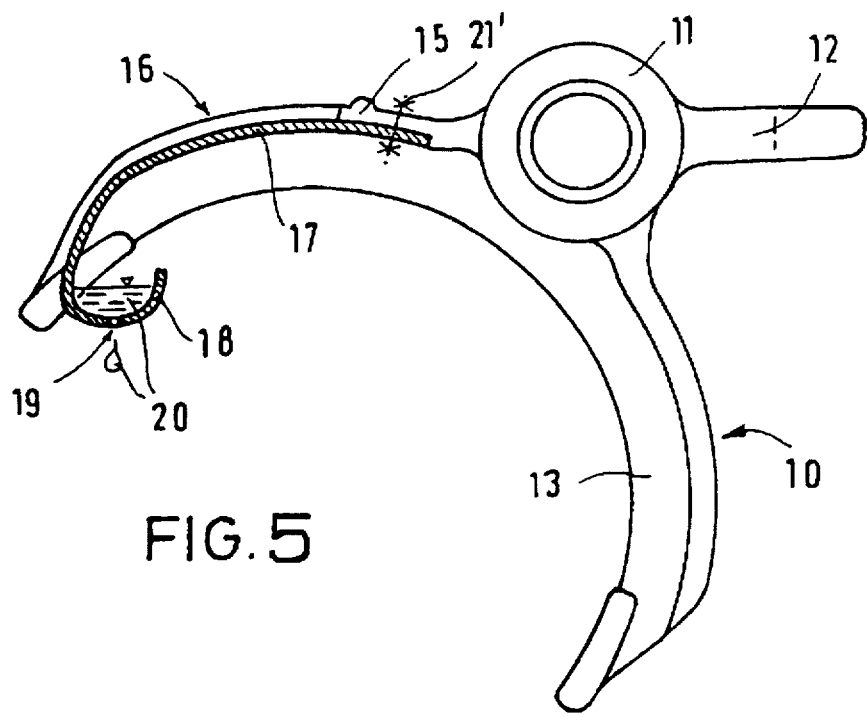
FIG. 5 is a side view of a selector fork illustrating a graphical drawing symbol for the connection of a baffle to the fork.
Figure 6:
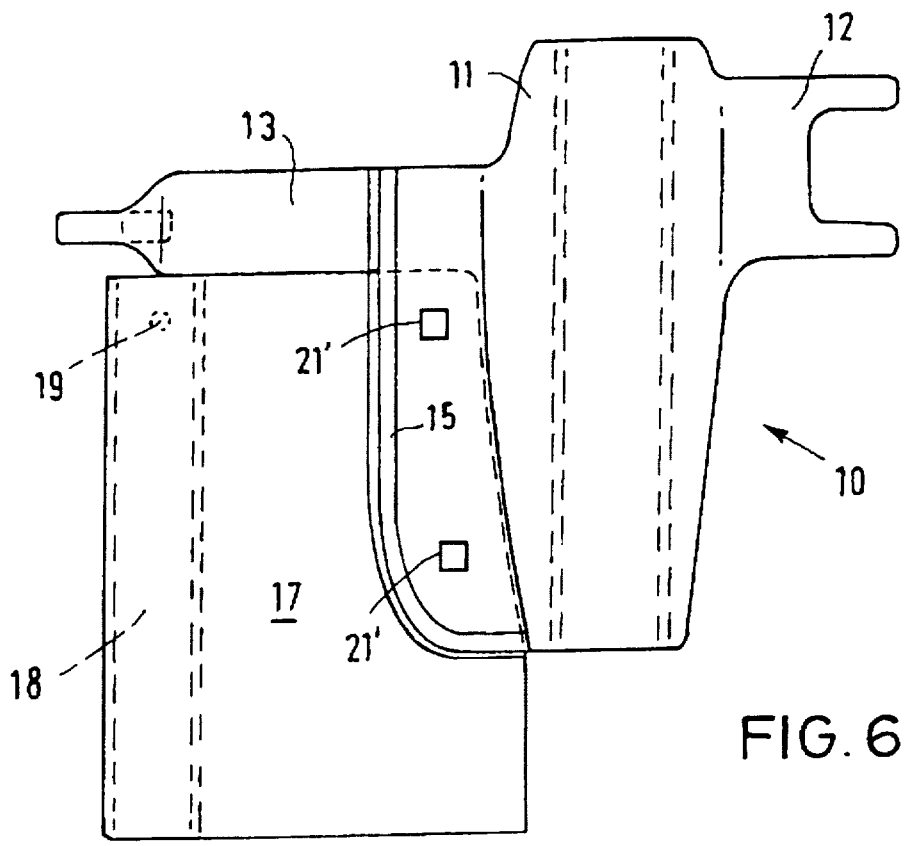
FIG. 6 is a top plan view of the selector fork shown in FIG. 5.

For a solution of the problem in mass production, however, more economical solutions are available, which consist in forming for supplying a lubricating oil supplying device of this kind as a plastic part which can be clipped on as illustrated by a graphic drawing symbol 21' in FIG. 5 and 6, or incorporated directly in the design of the selector fork as a sintered or die-cast part.

It will be seen that the aforementioned problem can be completely solved by means of the selector fork of the invention. Moreover, the selector fork of the invention also provides the further advantage that when the forward gear is engaged, the drainage of lubricating oil provides additional lubrication of the running gears of the forward gear.

While the above detailed description describes the preferred embodiment of the present invention, numerous modifications are envisioned which may be made without departing from the true spirit and scope of the present invention.

We claim:

1. A selector fork lubricator in a change-speed gearbox including a first shaft rotatably supported by the gearbox, a second shaft rotatably supported by the gearbox substantially parallel the first shaft, a pinion and gear pair supported by the first and second shafts respectively, a synchronizer ring supported by one of the group consisting of the first and second shafts adjacent a first gear selected from the group consisting of the pinion and gear pair for providing driving engagement therebetween, a selector rod having a longitudinal axis, the selector rod supported by the gearbox, and a selector fork slidably supported by the selector rod, the lubricator comprising:

lubrication means provided on the selector fork for the directed supply of splash oil to the synchronizer ring and the first gear of the pinion and gear pair, the lubrication means comprising:

an oil reservoir provided in said gearbox;

a member selected from the group consisting of the pinion and gear pair, the member rotating through said reservoir to splash oil therefrom; and a baffle plate provided on said selector fork extending in the direction of the longitudinal axis of the selector rod, said plate provided adjacent said member which rotates through the oil, said plate having a rolled-up collecting channel adjacent said member to collect oil splashed therefrom, and a drain provided in said baffle plate adjacent one of the group consisting of said synchronizer ring and said first gear selected from the pinion and gear pair to direct oil thereto.

2. A selector fork lubricator according to claim 1, wherein said baffle plate comprises a sheet metal part connected to the selector fork by means of screws.

3. A selector fork lubricator according to claim 1, wherein said baffle plate comprises a plastic part clipped on to the selector fork.

4. A selector fork lubricator according to claim 1, wherein the baffle plate is formed as an integral part of the selector fork in the form of a stamped, forged, sintered or die cast part.

5. A selector fork lubricator in a change-speed gearbox including a first shaft rotatably supported by the gearbox, second shaft rotatably supported by the gearbox substantially parallel the first shaft, a pinion and gear pair supported by the first and second shafts respectively, a synchronizer supported by one of the group consisting of the first and second shafts adjacent a first gear selected from the group consisting of the pinion and gear pair, a selector rod having a longitudinal axis, the selector rod supported by the gearbox, and a selector fork slidably supported by the selector rod, the lubricator comprising:

an oil reservoir provided in the gearbox;

a member selected from the group consisting of said pinion and gear pair, said member rotating through said reservoir to splash oil therefrom; and a baffle plate provided on the selector fork extending in the direction of the longitudinal axis of the selector rod, said plate provided adjacent said member which rotates through the oil, said plate having a rolled-up collecting channel adjacent said member to collect oil splashed therefrom, and a drain provided in said baffle plate adjacent the synchronizer to direct oil thereto.

* * * * *